Patented Nov. 9, 1943

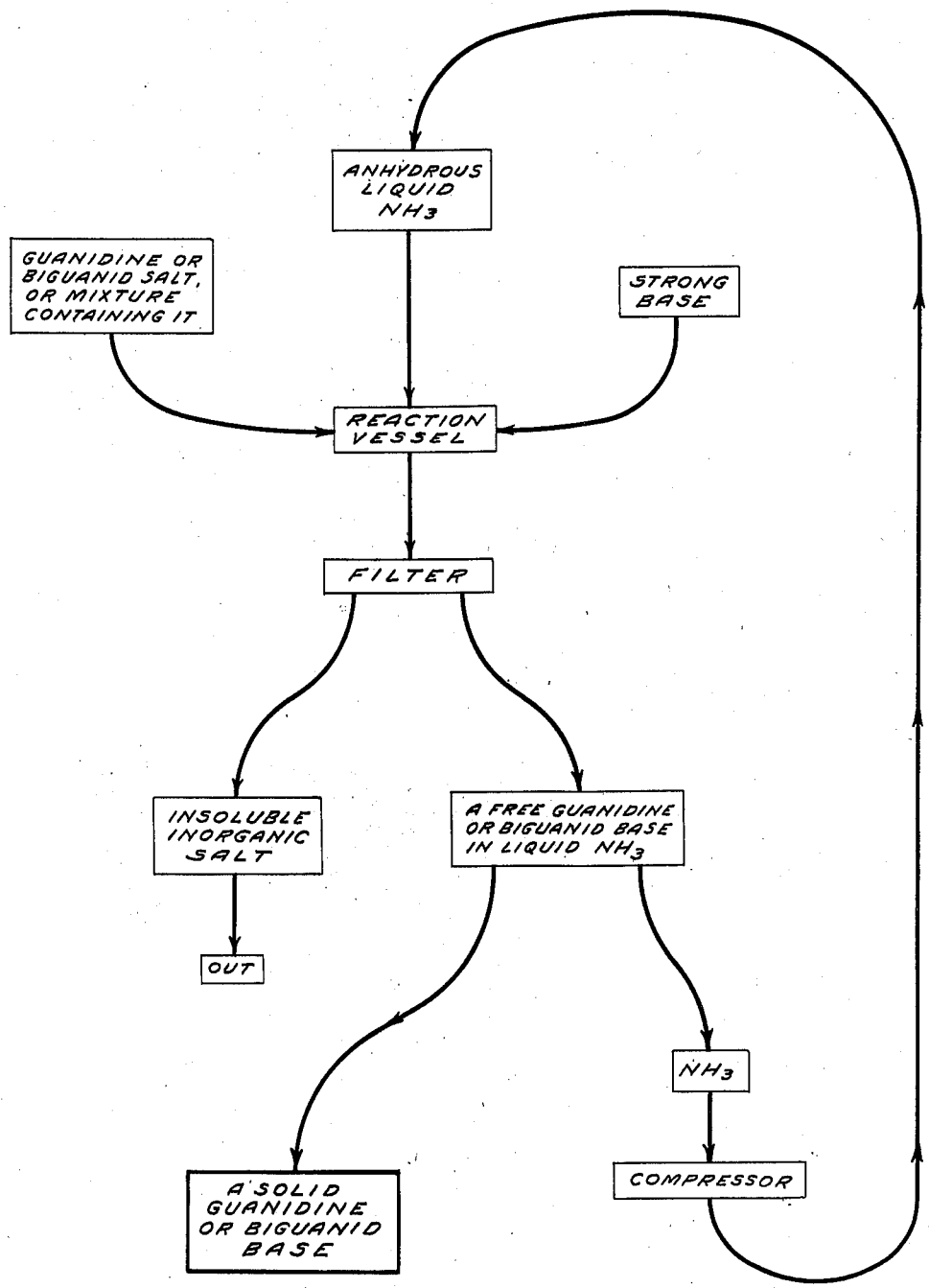

2,334,151

UNITED STATES PATENT OFFICE 2,334,151

PREPARATION OF FREE GUANIDINE AND BIGUANIDE BASES

Jack T. Thurston, Cos Cob, Conn., assignor to American Cyanamid Company, New York, N. Y., a corporation of Maine Application March 14, 1941, Serial No. 383,277

9 Claims. (Cl. 260—564)

This invention relates to the preparation of guanidine and biguanide bases and more particularly it relates to a method of recovering substantially pure guanidine or biguanide as the free base from its salts.

Because of the instability of the free bases they are not generally available on the market as such but in the form of acid salts. This necessitates setting free the base before the guanidine or biguanide can be employed in chemical reactions, which heretofore has presented several difficulties. If the biguanide acid sulfate, for example, is treated with a caustic alkali in an aqueous medium, free biguanide base cannot be recovered because of its extreme solubility. Furthermore the base decomposes if left in aqueous solution or picks up carbon dioxide from the atmosphere to form biguanide carbonate if allowed to stand for any length of time. Not only is it necessary, therefore, to prepare fresh quantities of the base whenever needed in chemical operations using a highly inefficient process as regards yield of the free base, but the product so obtained is extremely unstable and its purity cannot be relied upon. In many chemical syntheses the purity of intermediates used is of prime importance in the course of the reaction and over-all yields; the decomposition of biguanide, for example, which is an important intermediate in the field of textile assistants and dyes, not only detracts from the amount of product available for a given reaction, but decomposition products may in some cases hinder the process by either decreasing the reaction rate or causing a shift so that undesired reaction products are obtained. Its use therefore as an intermediate, particularly in the preparation of guanamines, is dependent to a considerable extent on the ease and degree of purity with which the free base can be obtained.

According to the present invention I have found that when a guanidine or biguanide salt, such as biguanide acid sulfate which is obtained from the condensation of dicyandiamide and ammonia or amine salts, is suspended in substantially non-aqueous liquid ammonia (95% or higher NH$_3$), and a strong basic substance added, the free base is formed which is soluble in liquid ammonia, whereas the sulfate radical unites with the basic substance to form a salt which is undissolved and can be removed by filtration. The biguanide remains stable in the liquid ammonia medium over a considerable period of time or if it is to be used directly, ammonia is evaporated at once.

A further modification of the present invention is the preparation of free bases in single step processes from their primary reactants, using liquid ammonia as the inert medium in which the reaction is carried out. In large commercial operations where biguanide or guanidine is prepared and used directly this permits a great saving as the intermediate step of isolating the bases in the form of salts is eliminated. The crude reaction mixture resulting from the synthesis is suspended in liquid ammonia and the free base recovered on adding a strong inorganic alkali whereupon the alkali metal salt and other impurities precipitate out and are filtered, and the liquid ammonia solution yields a high-grade, substantially anhydrous stable product.

In carrying out the present invention any strong inorganic alkali capable of setting free the biguanide or guanidine and which also forms acid salts substantially insoluble in liquid ammonia can be employed. Thus for example caustic alkalies such as sodium or potassium hydroxide are effective as well as their alkoxides such as sodium methoxide or potassium ethoxide. It is advantageous in some cases to use the free metals such as sodium or potassium directly as by this procedure the reaction is kept substantially anhydrous which materially increases the yield of product. Therefore the term "strong basic substance" as used in the specification and claims is intended to cover both the alkali metal hydroxides or alkoxides and the free alkali metals.

It is an advantage that contamination of the free base with excess alkali can be avoided by using a liquid ammonia insoluble alkali. Thus, any amount over that theoretically required to free the base from its salt remains undissolved and is filtered off with the insoluble alkali metal salt. While, therefore, it is possible to use any of the strong alkalis in the process of the present invention, the liquid ammonia insoluble alkalis are preferred.

The liquid ammonia used in practicing my invention is preferably substantially anhydrous liquefied ammonia, but amounts of water not exceeding about 5% do not appear to materially decrease the efficiency of operation.

The invention is generally shown in the accompanying flow sheet and will be described in greater detail in conjunction with the following specific examples which are given by way of illustration and the invention is not intended to be limited thereby:

*Example I*

Biguanide acid sulfate was suspended in liquid ammonia and two equivalents of finely powdered sodium hydroxide were added. The reaction mixture was stirred for about one and one-half hours, and then filtered to remove the insoluble sodium sulfate. On evaporation of the liquid ammonia solution, the free biguanide base was obtained in a yield of about 77% of the theoretical.

Example II

Guanidine acid sulfate was suspended in liquid ammonia and two equivalents of finely powdered sodium hydroxide were added. The reaction mixture was stirred for about one and one-half hours whereupon sodium sulfate was precipitated and removed by filtration. On evaporation of the ammonia solution a high yield of pure guanidine was obtained.

Example III

To 400 parts of liquid ammonia containing 75 parts of n-biguanyl morpholine hydrochloride, which was prepared from dicyandiamide and morpholine hydrochloride, was added 8.3 parts of sodium metal. The metal dissolved in the solvent without sodamide formation and immediately combined with the acid radical to form sodium chloride which was removed by filtration. On evaporation of the liquid ammonia filtrate, 53 parts or 86% of the theoretical yield of morpholinobiguanide melting at 155–157° C. was obtained.

Example IV

To 124 parts of 1,1-dimethylguanidine hydrochloride dissolved in 800 parts of liquid ammonia was added 23 parts of sodium metal. After stirring the mixture, substantially free of sodamide, the sodium chloride was removed by filtration and the ammonia was allowed to evaporate. The yield of free 1,1-dimethylguanidine was 72 parts or 83% of the theoretical.

It is not intended that the present invention be limited to the use of acid sulfates or hydrochlorides as the salts from which the free bases are obtained, but any form of a biguanide or guanidine combined with other radicals, or crude mixtures containing these compounds can be used. Best results are obtained, however, when these other groups are substantially insoluble in liquid ammonia, as in such cases the selective solubility effects a simultaneous purification along with the preparation of the free base.

The process employed in the above examples can likewise be used to prepare other substituted aliphatic and aromatic guanidines and biguanides such as trimethyl guanidine, dibutyl guanidine, mono-, di-, and triphenyl guanidine, ditolyl guanidine, mono-, di-, and triethanol guanidine, mono- and dimethyl buguanide, phenyl biguanide, diethyl biguanide, diamyl biguanide, 1,5 diallyl biguanide, 1,1,5,5 tetramethyl biguanide, 1,1,2 trimethyl biguanide, 1,2,3 triphenyl biguanide, and the like.

It should be noted that in the present invention the liquid ammonia is used purely as a solvent and should not be confused with cases where liquid ammonia has been used to set free weak organic bases from their salts. In the present case, if a salt of such a strong base as biguanide or guanidine is treated with liquid ammonia alone in the absence of a strong inorganic base such as caustic alkali, no substantial amount of free biguanide or guanidine would be set free.

While the invention has been shown and described with particular reference to specific embodiments, it is to be understood that it is not to be limited thereto but is to be construed broadly and restricted solely by the scope of the appended claims.

What I claim is:

1. A method of preparing a guanyl base included in the group consisting of guanidines and biguanides which comprises dispersing a crude mixture containing a compound having the mentioned guanyl radical in substantially anhydrous liquid ammonia, adding sufficient amounts of a strong basic substance chosen from the group consisting of alkali metals, their hydroxides and alkoxides, to convert the guanyl compound to its free base and filtering off the insoluble products.

2. A method of recovering a substantially pure guanyl base included in the group consisting of guanidines and biguanides from a crude mixture, which comprises dispersing the mixture containing a compound having the mentioned the guanyl base radical in substantially anhydrous liquid ammonia, adding sufficient amounts of a strong basic substance chosen from the group consisting of alkali metals, their hydroxides and alkoxides, to convert the guanyl compound to its free base, filtering off the insoluble products and recovering the guanyl base by evaporation of ammonia.

3. A method of preparing a free guanyl base included in the group consisting of guanidines and biguanides from a guanyl salt which comprises dispersing the salt in substantially anhydrous liquid ammonia, adding sufficient amounts of a strong basic substance chosen from the group consisting of alkali metals, their hydroxides and alkoxides, to convert the guanyl salt to its free base and filtering off the insoluble products.

4. A method of recovering a free guanyl base included in the group consisting of guanidines and biguanides from a guanyl salt which comprises dispersing the salt in substantially anhydrous liquid ammonia, adding sufficient amounts of a caustic alkali to convert the guanyl salt to its free base, filtering off the insoluble alkali salt and recovering the guanyl base by evaporation of ammonia.

5. A method of recovering a free guanyl base included in the group consisting of guanidines and biguanides from a guanyl salt which comprises dispersing the salt in substantially anhydrous liquid ammonia, adding sufficient amounts of an alkali metal to combine with the acid radical of the guanyl salt, filtering off the insoluble alkali salt and recovering the guanyl base by evaportion of ammonia.

6. A method of preparing a free guanyl base included in the group consisting of guanidines and biguanides from a guanyl salt which comprises dispersing the salt in liquid ammonia containing at least 95% $NH_3$, adding sufficient amounts of a caustic alkali to convert the guanyl salt to its free base and filtering off the insoluble alkali salt.

7. A method of recovering a free guanyl base included in the group consisting of guanidines and biguanides from a guanyl salt which comprises dispersing the salt in liquid ammonia containing at least 95% $NH_3$, adding sufficient amounts of an alkali metal to combine with the acid radical of the guanyl salt, filtering off the insoluble alkali salt and recovering the guanyl base by evaporation of ammonia.

8. A method of producing free guanidine from a guanidine salt which comprises dispersing the salt in liquid ammonia containing at least 95% NH₃, adding sufficient amounts of a caustic alkali to convert the guanidine salt to its free base and filtering off the insoluble alkali salt.

9. A method of producing free biguanide from a biguanide salt which comprises dispersing the salt in liquid ammonia containing at least 95% NH₃, adding sufficient amounts of a caustic alkali to convert the biguanide salt to its free base and filtering off the insoluble alkali salt.

JACK T. THURSTON.